US008052769B2

(12) United States Patent
Schultink et al.

(10) Patent No.: US 8,052,769 B2
(45) Date of Patent: Nov. 8, 2011

(54) FILTER BAG AND METHOD FOR THE PRODUCTION THEREOF

(75) Inventors: Jan Schultink, Overpelt (BE); Ralf Sauer, Overpelt (BE)

(73) Assignee: Eurofilters N.V., Overpelt (BE)

( * ) Notice: Subject to any disclaimer, the term of this patent is extended or adjusted under 35 U.S.C. 154(b) by 538 days.

(21) Appl. No.: 12/097,166

(22) PCT Filed: Dec. 15, 2006

(86) PCT No.: PCT/EP2006/012123

§ 371 (c)(1), (2), (4) Date: Sep. 11, 2008

(87) PCT Pub. No.: WO2007/073889

PCT Pub. Date: Jul. 5, 2007

(65) Prior Publication Data

US 2009/0090092 A1 Apr. 9, 2009

(30) Foreign Application Priority Data

Dec. 15, 2005 (DE) ........................ 10 2005 060 032

(51) Int. Cl.
*B01D 46/02* (2006.01)

(52) U.S. Cl. ...... 55/382; 55/524; 55/DIG. 2; 55/DIG. 3; 55/DIG. 5; 156/199; 156/200; 156/201; 156/202; 156/203; 264/145; 264/159; 264/160; 264/171.1; 264/DIG. 48

(58) Field of Classification Search .................... 55/382, 55/524, DIG. 2, DIG. 3, DIG. 5; 156/199, 156/200, 201, 202, 203; 264/145, 159, 160, 264/171.1, DIG. 48

See application file for complete search history.

(56) References Cited

U.S. PATENT DOCUMENTS

| | | | | |
|---|---|---|---|---|
| 2,225,389 | A * | 12/1940 | Osterdahl | 55/376 |
| 3,297,232 | A * | 1/1967 | Fesco | 55/380 |
| 3,330,100 | A | 7/1967 | Fesco | |
| 3,333,523 | A | 8/1967 | Terzuoli | |
| 3,392,906 | A | 7/1968 | Fesco | |
| 3,404,515 | A * | 10/1968 | Fesco | 55/377 |
| 3,479,802 | A * | 11/1969 | Fesco | 55/367 |
| 3,572,017 | A | 3/1971 | Terzuoli | |
| 3,596,443 | A * | 8/1971 | Goldberg | 55/376 |
| 3,616,621 | A * | 11/1971 | Fesco | 55/367 |
| 3,755,993 | A * | 9/1973 | Cote | 55/370 |
| 4,240,813 | A * | 12/1980 | Fesco | 55/381 |
| 4,322,259 | A * | 3/1982 | Fesco | 156/203 |
| 6,045,595 | A * | 4/2000 | Freudenberg | 55/382 |
| 6,251,154 | B1 * | 6/2001 | van Rossen | 55/382 |
| 2007/0175190 | A1 | 8/2007 | Schultink | |

FOREIGN PATENT DOCUMENTS

| | | |
|---|---|---|
| DE | 38 12849 | 10/1989 |
| DE | 20 2005 00918 | 3/2005 |
| DE | 103 48 375 | 5/2005 |
| EP | 1 059 056 | 12/2000 |
| EP | 1 192 890 | 4/2002 |
| WO | 01 / 03802 | 1/2001 |
| WO | 01 / 56448 | 8/2001 |

* cited by examiner

*Primary Examiner* — Robert A Hopkins
*Assistant Examiner* — Minh-Chau Pham
(74) *Attorney, Agent, or Firm* — Fay Kaplun & Marcin, LLP

(57) ABSTRACT

A filter bag for a vacuum cleaner includes a tubular bag made of a casing which has at least one nonwoven layer. The casing has a first end region which is sealed at least partially and a second sealed end region situated opposite the first end region. The first end region is folded and forms a base.

35 Claims, 18 Drawing Sheets

FILTER BAG AND METHOD FOR THE PRODUCTION THEREOF

FIELD OF INVENTION

The invention relates to a filter bag for a vacuum cleaner, comprising a tubular bag made of a casing which has at least one nonwoven layer, said casing having a first end region which is sealed at least partially and a second sealed end region situated opposite said first end region, the first end region being folded and forming a base. The invention relates furthermore to a method for the production of a filter bag of this type.

BACKGROUND INFORMATION

Filter bags for vacuum cleaners which have a tubular bag and which, in addition to a closed end region, have a folded base, a so called block base, are known in the state of the art. Normally, filter bags of this type are manufactured from a paper material which can be processed in normal tubular bag plants. In the case of filter bags of this type, a corresponding retaining plate is generally fitted on the block base and has an opening through which the air to be cleaned is guided. The object of the block base resides in stabilising the filter bag and in forming a three-dimensional bag. Furthermore, the block base facilitates fitting of the bag in the vacuum cleaner.

In recent times, new developments have become known with respect to vacuum cleaner bag materials, such as are described for example in WO 01/03802 A1. A special nonwoven material comprising a plurality of layers of filter material, which are independent of each other, is disclosed therein. These independent layers are combined to form a filter material with specific properties. In practice, it has now been shown that vacuum cleaner bags which are produced with a nonwoven material of this type are significantly superior relative to those previously known with respect to the performance of the vacuum cleaner, in particular with respect to the dust storage capacity.

It is problematic with filter bags which are produced from a previously described material however that it is difficult to form a block base because of the floppiness of the bag material during bending.

There has been no lack of attempts to produce a remedy by means of specific solutions. One possibility for forming a block base in the case of a vacuum cleaner bag which is produced from a nonwoven material as described previously is described in DE 103 48 375 A1. In the case of production method disclosed there, the process thereby takes place such that, after formation of the tube, the latter is sealed on one side with formation of an at least partially sealed region. As a result, as described previously, of the fact that the tube is welded together after being cut, the result is a connection of both internally situated layers of the tubular bag in the edge region. In a subsequent method step, in the case of the previously described method, stabilisation of the base is then achieved by introducing a die and folding over the narrow sides on the base and gluing thereof.

The production method and also the dust filter bags formed with the production method therefore always have a central weld seam which is formed in the edge region and in the case of which the two inner sides respectively are welded to each other.

It is however disadvantageous with the previously described filter bags that these do not always provide a satisfactory result with respect to the stability of the base for the high requirements in the vacuum cleaner and the required different shapes of filter bag. Furthermore, the method for the production of filter bags according to DE 103 48 375 A1 is very complex and cost-intensive. Furthermore, the seam which is vertical can make gluing or welding of the retaining plate on the base very difficult. Leaks can only be avoided with difficulty.

SUMMARY OF INVENTION

The present invention relates to a filter bag comprising a casing made of at least one nonwoven layer and which has a block base which has sufficient stability even for the most varied of requirements in the field of vacuum cleaners. Furthermore, it is the object of the present invention to indicate a corresponding method for the production of a filter bag of this type which is intended in particular to be as simple as possible in the production process.

According to an exemplary embodiment of the present invention, the end region which forms the base is effected by overlapping the inner side and outer side of the casing, the overlapping region being connected at least partially by at least one weld seam. The filter bag according to the present invention thus differs from the filter bag as described in DE 103 48 375 A1 in that the base here is now stabilised by overlapping the inner and outer side of the casing. It emerged surprisingly that it is adequate, in order to form a stable base, if the inner and outer sides of the casing overlap and are connected at least partially by at least one weld seam. Overlapping of the inner and outer sides of the nonwoven layer is hence essential for the filter bag according to the present invention. It is thereby favourable if the overlapping of the inner and outer sides extends over a region of at least 3 mm. The overlap can thereby reach at most up to the entire width of the base, i.e. the inner and outer sides are overlapped so far that the base is completely covered by the overlap. However, it is preferred that an overlapping region is chosen which is between half of the width of the base and 3 mm. A retaining plate can be glued or welded on this horizontal weld seam without difficulty.

The weld seam which is provided according to the present invention in order to join the overlapping region is thereby guided preferably over the entire width of the base. A weld seam of this type is preferably linear. The invention thereby comprises of course also embodiments in which two or more parallel weld seams are provided according to the width of the overlapping region.

In the case of the filter bag according to the invention, it should be emphasised in particular that, as a result of the previously described configuration of the base, i.e. by overlapping the inner and outer sides and forming an overlapping region, self-stabilisation of the base is achieved which has actually such high stability that the base is sufficiently stable even without additional fixing of a retaining plate.

The base preferably has an oblong shape, particularly preferred a rectangular shape.

Further stabilisation of the base can be achieved in addition with filter bags of the invention in that stacked layers are formed by folding the narrow sides of the rectangular base which in turn are connected to each other at least partially. These stacked layers of the narrow sides can be folded back thereby on the base and be connected to the latter. On the other hand, folding of these stacked layers of the narrow side is also possible on the side faces of the tubular bag. Finally, the invention also comprises embodiments in which the stacked layers of the narrow sides are removed, however the prerequisite here then being that the consequently laterally resulting open region is sealed again by welding.

For the stacked layers of the narrow sides which are formed in regions by folding, the connection can be effected by gluing and/or by welding.

In the case of the vacuum cleaner bag according to the invention, it is favourable in addition if, over the longitudinal sides, i.e. over those surfaces of the vacuum cleaner bag which are between the closed ends and the at least partially closed end with the base configured according to the invention, pre-folds are introduced into the consequently extending side face so that a fold is possible. The pre-folds can thereby be configured such that they extend for example from the respective corners of the base, if the latter is formed with corners or quadrilaterally, and are guided up to the opposite end. It is advantageous in addition if, starting in addition from the central weld seam, one further pre-fold respectively is introduced into the casing. The introduction of side folds is consequently facilitated and the surface of the vacuum cleaner bag is enlarged. At the same time, the pre-folds which are introduced in the longitudinal sides of the vacuum cleaner bag can serve for further stabilisation of the bag material. There should be understood by pre-fold in the sense of the invention, material compressions which are preferably configured linearly. The pre-folds can be introduced by suitable shaping tools and/or by welding. Advantageously, the filter bag according to the invention likewise has a pre-fold which is guided parallel to the central weld seam. This pre-fold serves to fold over the base in the direction of the longitudinal sides of the filter bag. It is therefore adequate if one pre-fold of this type is present. The spacing of the pre-fold is chosen such that it corresponds to half the width of the base starting from the central weld seam.

With respect to the retaining plate, it is possible according to the present invention to join the latter either to the block base or to fit the retaining plate on the free side faces of the vacuum cleaner bag. However, the embodiment is hereby preferred in which the retaining plate is connected securely to the base. The retaining plate can thereby cover the entire base or also only partially. If the retaining plate is attached to the base, it is of course necessary that a corresponding through-opening is introduced into the base, said through-opening corresponding to the through-opening of the retaining plate. If, as previously described, the retaining plate and the through-openings are fitted on the base, the initially described continuous weld seam is of course interrupted.

The retaining plate is thereby constructed as known per se from the state of the art and has at least one through-opening which serves for the supply of air to be cleaned. The retaining plate can have in addition an element, e.g. a slide or a flap for closing the opening. The retaining plate can thereby be connected to the base of the bag with all current techniques of the state of the art. There are possible for this purpose gluing or welding.

The retaining plate, as known per se from the state of the art, can be made of plastic material or cardboard.

The filter bag according to the present invention is preferably formed from a nonwoven material, as is described in WO 01/03802 A1. It is preferred in the case of the filter bag according to the invention if the latter comprises a plurality of nonwoven layers, these being able to have different filter properties. Reference is made expressly to the disclosure content of WO 01/03802 A1.

The invention relates in addition to a method for the production of a filter bag as previously described.

The method is thereby implemented such that, in a first step, folding of a casing web of the filter bag material is undertaken in order to form a tube.

In the second step, the tube is then placed on a corresponding anvil which defines the shapes of the filter bag.

In a subsequent step (method step c)), separation of the corresponding tube section is then undertaken and subsequently (method step d)) the folding over of the longitudinal sides is then effected onto the anvil whilst forming an overlap of the inner and outer sides of the casing.

Subsequently, welding of the overlapping region is then implemented and the filter bag is then removed from the anvil. Finally, welding of the second end region is also implemented as last method measure.

It is therefore essential in the method according to the invention that overlapping of the inner and outer sides of the casing is undertaken and consequently stabilisation of the base can be achieved. As a result of the fact that the method according to the invention can be implemented in a cycle by means of one device, the method can be implemented simply and economically with respect to processing technology. It has been shown furthermore that the method proceeds with high precision and with a very low reject rate.

The method according to the invention as described previously can be modified such that another folding-over of the narrow sides is integrated jointly at the same time.

BRIEF DESCRIPTION OF DRAWINGS

The invention is described subsequently in more detail with reference to FIGS. 1 to 18.

DETAILED DESCRIPTION

The Figure sequence 1 to 6 shows the individual steps for the production of a filter bag according to the invention according to a first embodiment.

Figure 1:
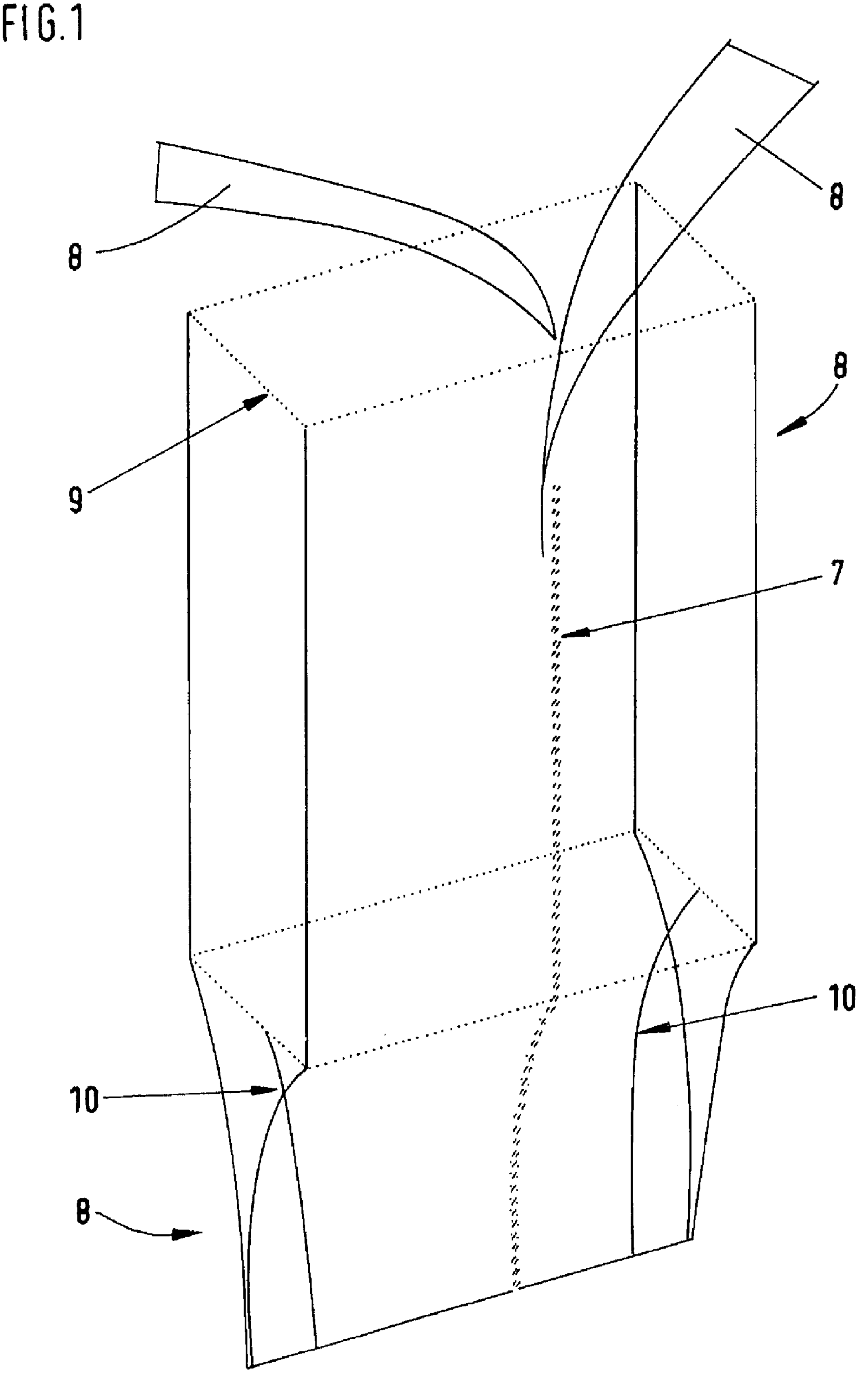
FIGS. 1 to 6 show the sequence for the production of a first embodiment of a filter bag according to the invention.

FIG. 1 thereby shows the first method step for formation of the tube in which a casing web 8 is folded over a template 9 which defines the shape of the filter bag and a weld seam 7 then being applied in order to form a tube. In the case of the example according to FIG. 1, the template 9 is configured in the form of a rectangular box so that, as is shown with reference to the further Figure sequence, the base of the filter bag to be produced subsequently has a rectangular shape which corresponds to that prescribed approximately by the template 9. One advantage of the method according to the invention and hence also that of the filter bag which is produced resides in the fact that, by prescribing the template 9, any shapes of filter bags can be produced with respect to the base. The casing web 8, which is used according to the embodiment according to FIG. 1, concerns a multilayer nonwoven layer with different filter properties. Corresponding composite materials are mentioned in WO 01/03802 A1.

As emerges in addition from FIG. 1, it is favourable if, after this method step, i.e. after formation of the tube by folding over the template 9 and welding on the longitudinal seam 7, subsequent lateral folds 10 are introduced into the tube. The introduction of the lateral folds 10 can be effected by measures which are known per se from the state of the art, i.e. for example by shaping tools or by weld seams.

Figure 2:
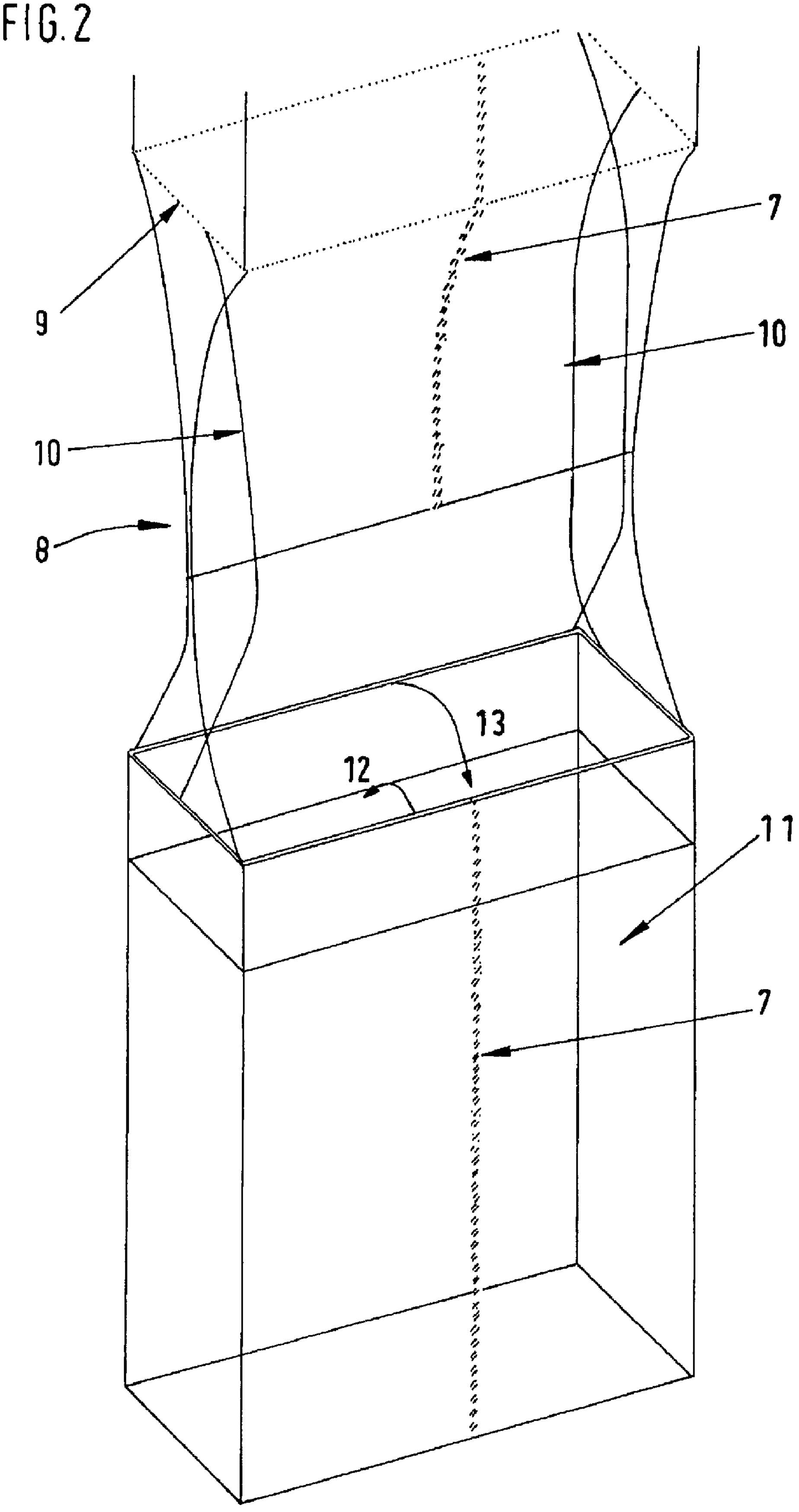

In FIG. 2, the next method step of the method according to the invention is represented. After formation of the tube, the thus produced tube is drawn onto an anvil 11, as here in the case of the example with the introduced lateral folds 10. The pre-folds produced during formation of the lateral folds are thereby maintained. The shape of the anvil 11 is thereby preferably chosen like that of the template 9 in the present method step. After drawing the tube onto the anvil 11, a corresponding tube section is separated (method step c)), as then shown in FIG. 2. Subsequently, folding of the longitudinal sides 12 and 13 onto the anvil is effected whilst forming an overlapping region 3 (see FIG. 3).

Figure 3:
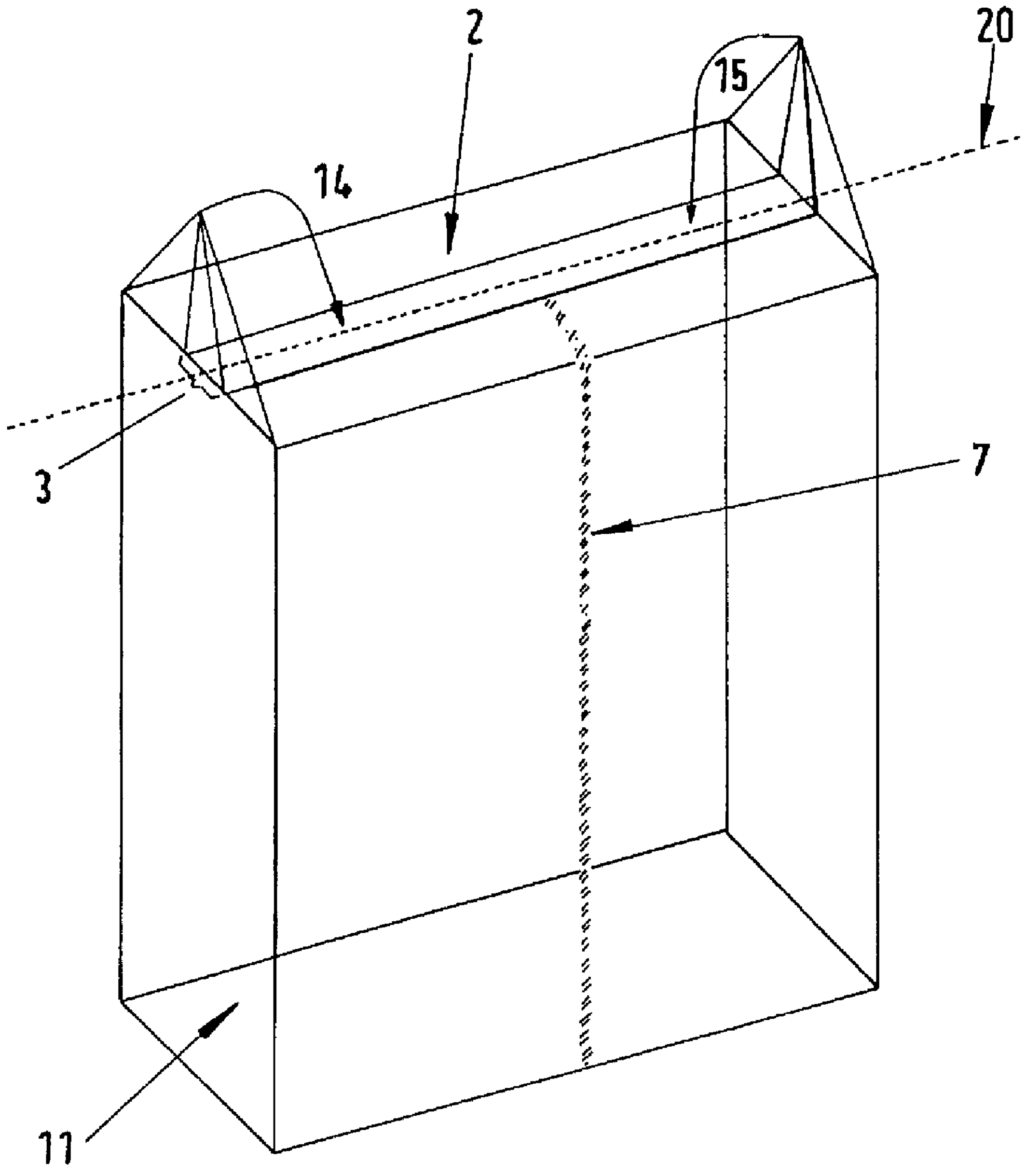

In the production method which is represented in the Figure sequence 1 to 6, an embodiment is achieved in which the narrow sides 14, 15 of the base are folded back in addition onto the base 2 itself. The layers of the narrow sides which are folded one over the other can now be fixed on the base 2 by methods known per se from the state of the art, i.e. for example by means of gluing or likewise by means of ultrasonic welding. In FIG. 3, the imaginary central line of the base 2 through the line 20 is represented.

Figure 4:
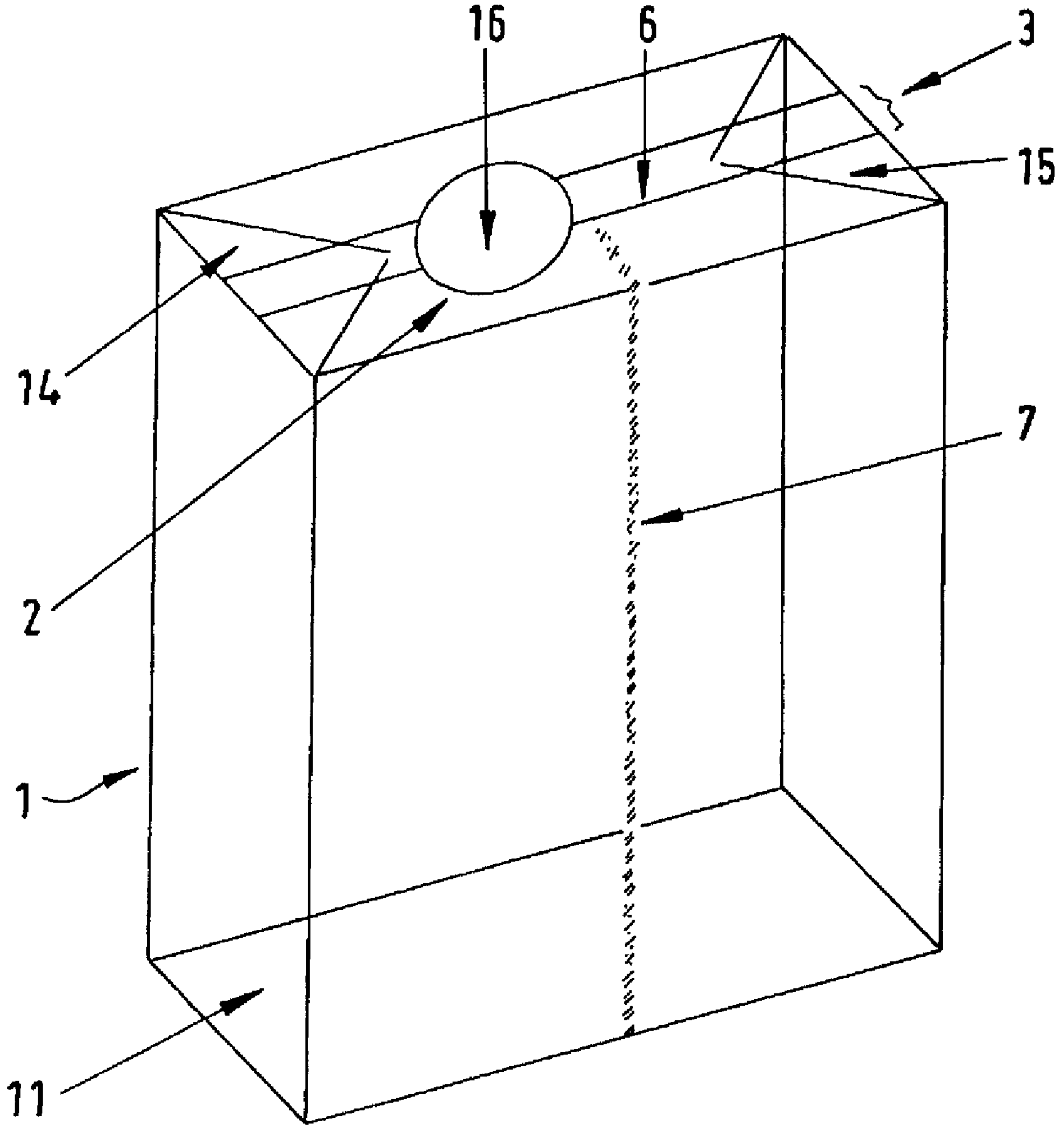

FIG. 4 now shows the next method step for the production of the filter bag, as is represented by way of example in FIGS. 1 to 6. As emerges from FIG. 4, the overlapping region 3 is welded by applying a base seam 6 after folding over the narrow sides 14, 15. As emerges from FIG. 4, another hole punch is undertaken here into the base 2 so that a through-opening 16 is formed in the base 2.

Figure 5:
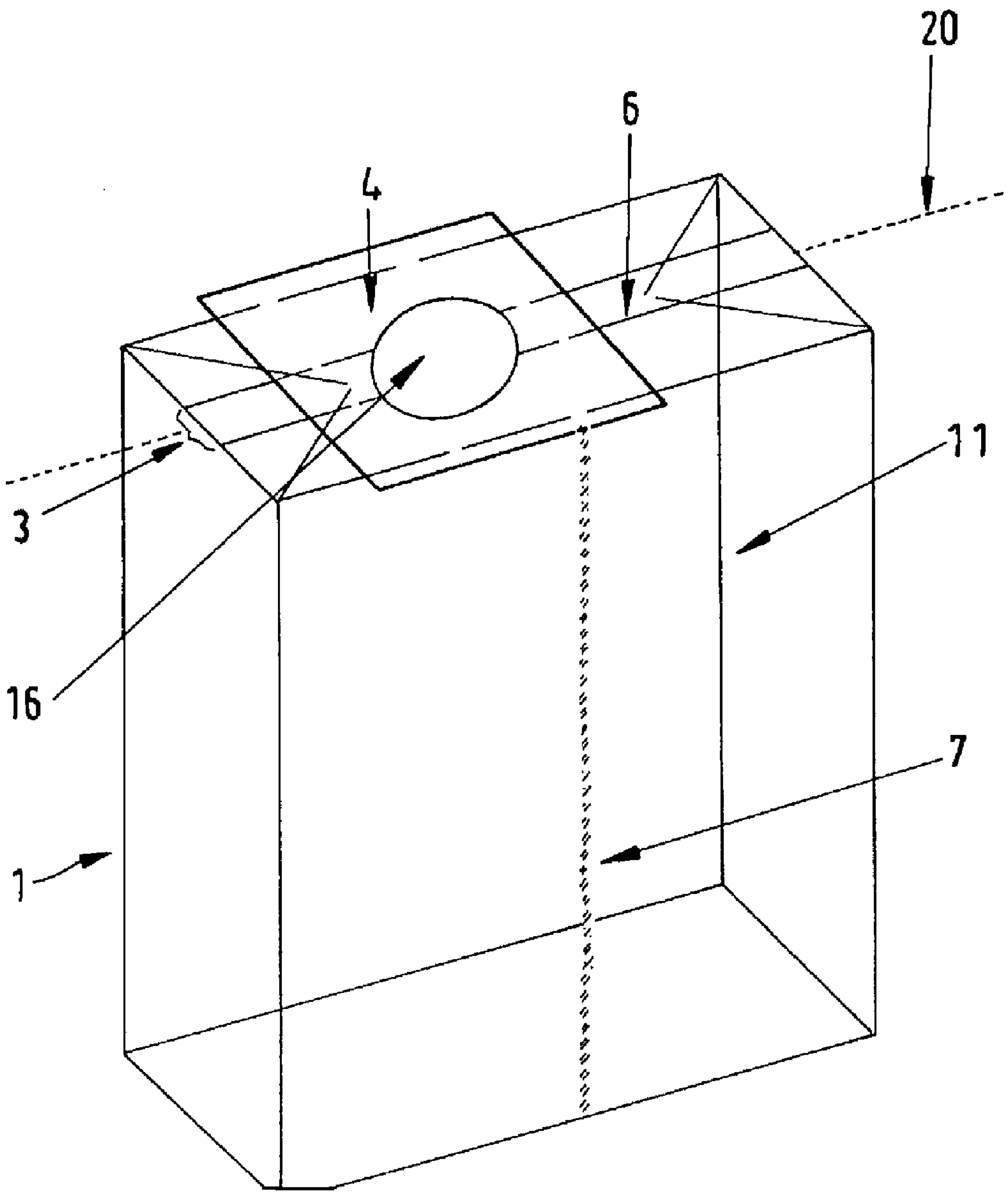

In FIG. 5, the state of the filter bag 1 is now represented, which is produced when, according to the method step represented in FIG. 4, another retaining plate 4 is applied subsequently on the base 2. The retaining plate 4 can thereby be connected to the base 2 either by gluing or by welding. The retaining plate 4 thereby has a corresponding opening to the opening 16 in the base 2 of the filter bag. The invention thereby comprises all the embodiments in which the retaining plate not only has the rectangular shape represented in FIG. 5 but also other shapes which can cover for example also the entire base 2. The retaining plate 4 is thereby preferably configured in one piece and can also have elements for sealing the through-opening 16.

Figure 6:
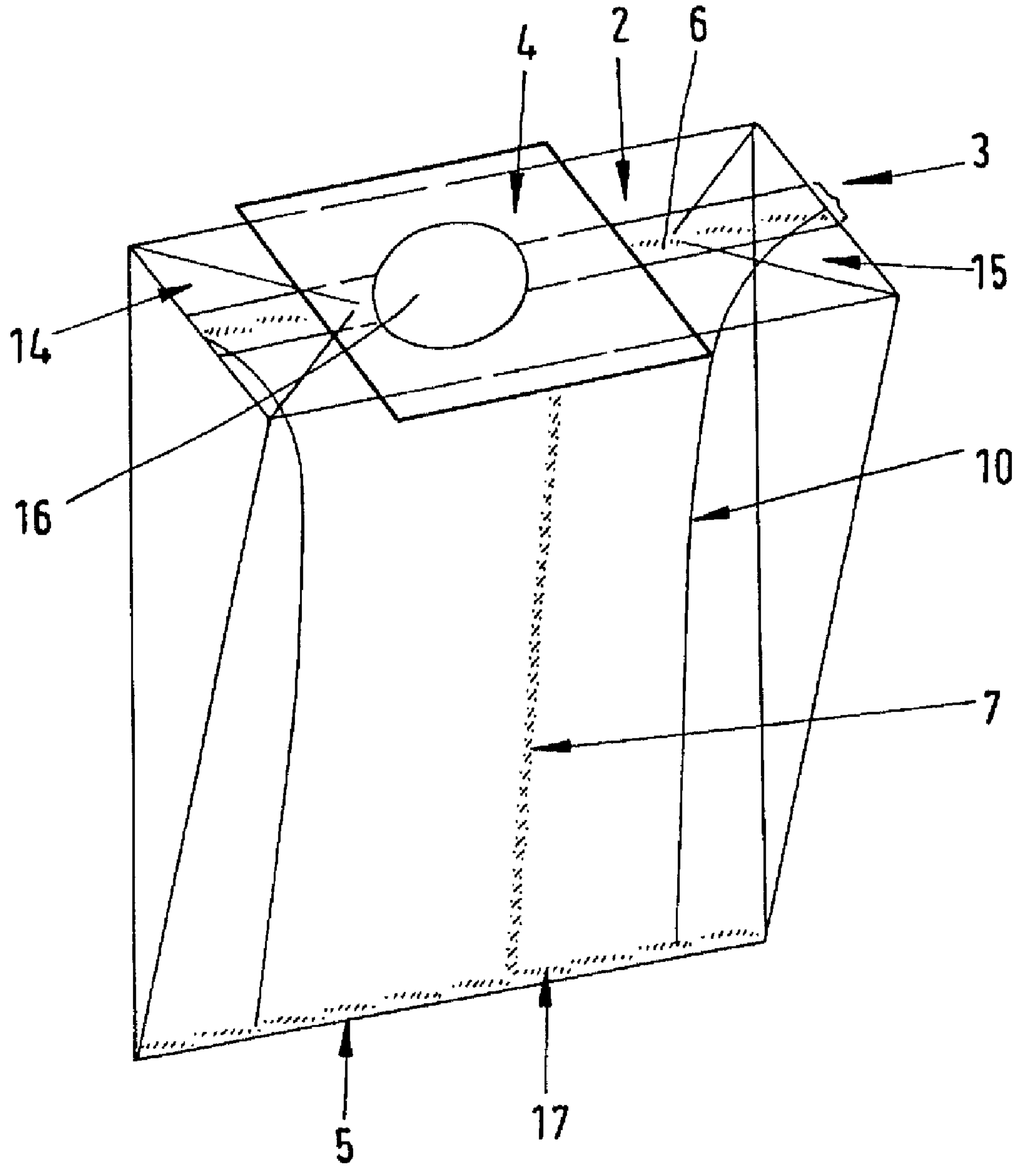

Finally, in FIG. 6 of the Figure sequence 1 to 6 for the production of a first embodiment of the filter bag according to the invention, the final state is shown which is produced after conclusion of the method. Subsequent to the method state represented in FIG. 5, the filter bag 1 is removed for this purpose from the anvil 11 and the second end region 5 situated opposite the base 2 is sealed by a weld seam 17.

Figure 7:
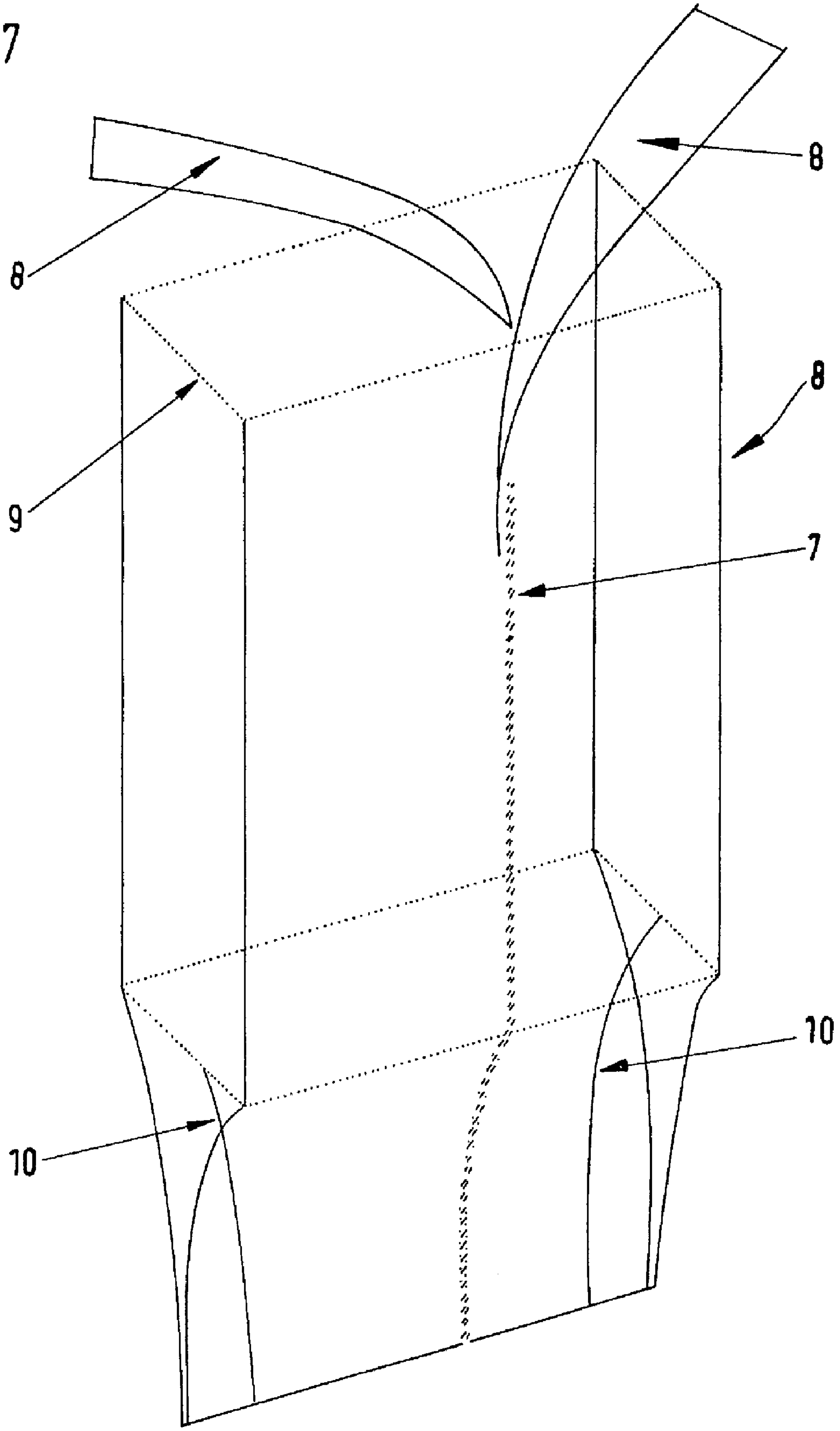
FIGS. 7 to 12 show the corresponding Figure sequence for the production of a filter bag according to the invention in a second embodiment.
Figure 8:
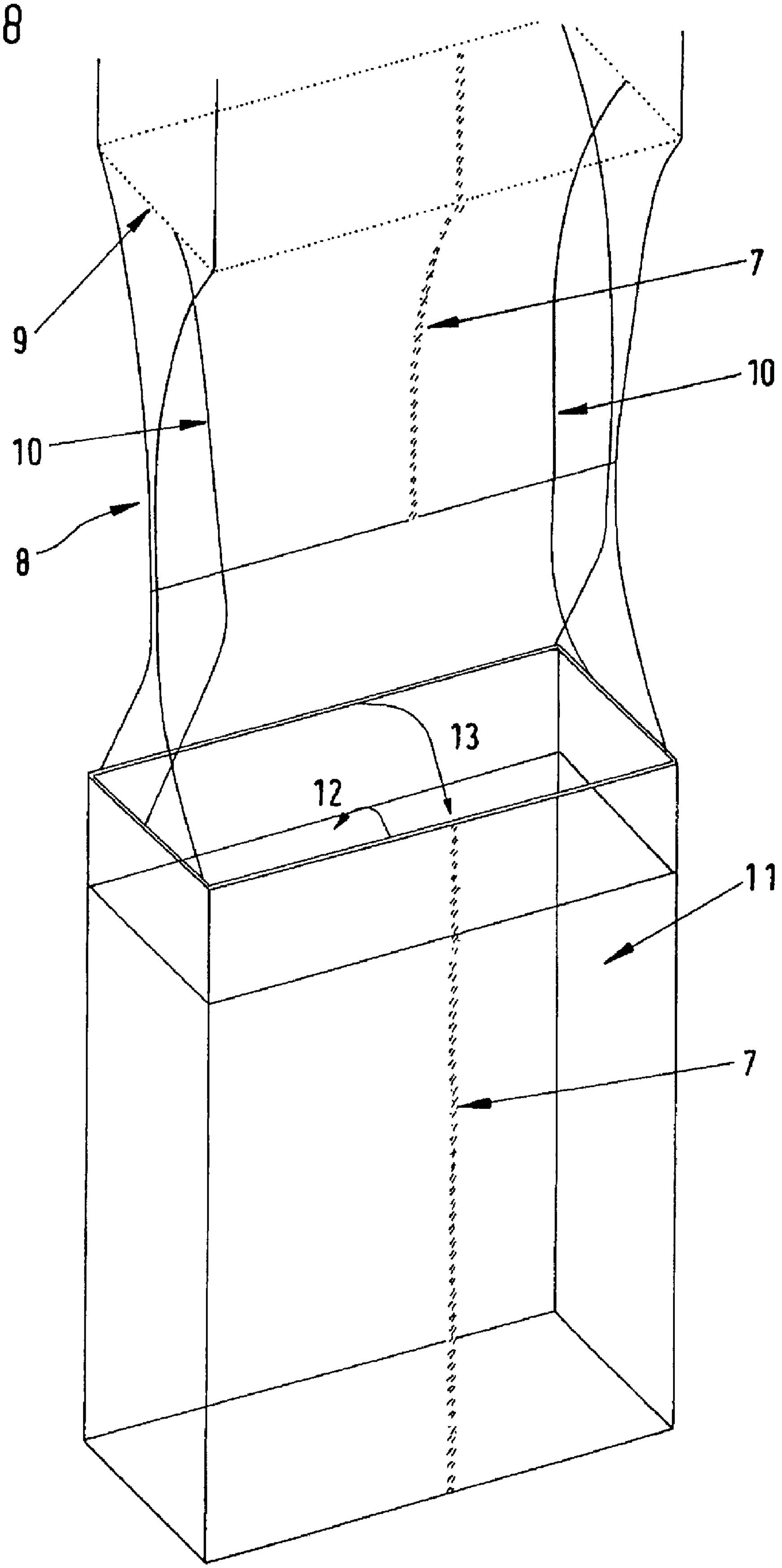
Figure 9:
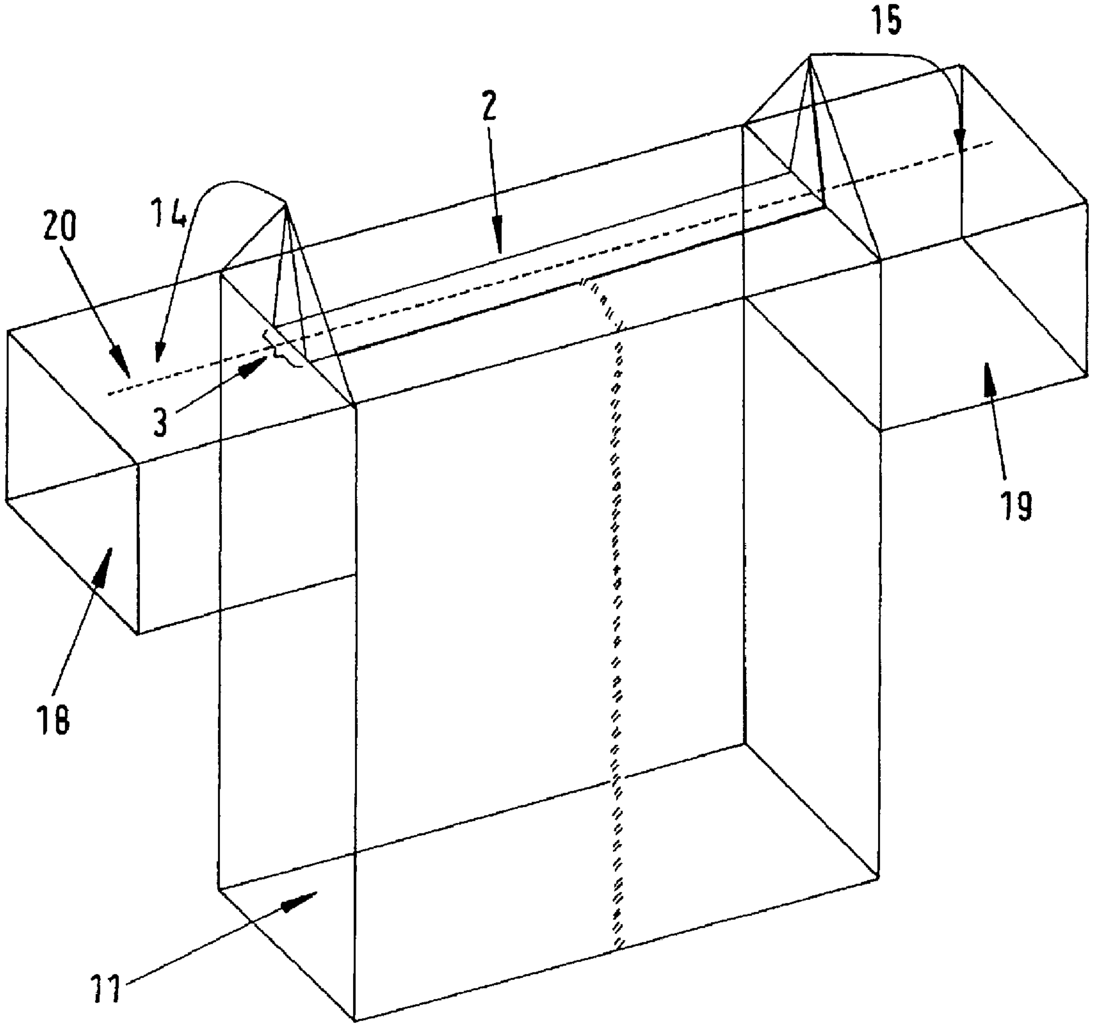
Figure 10:
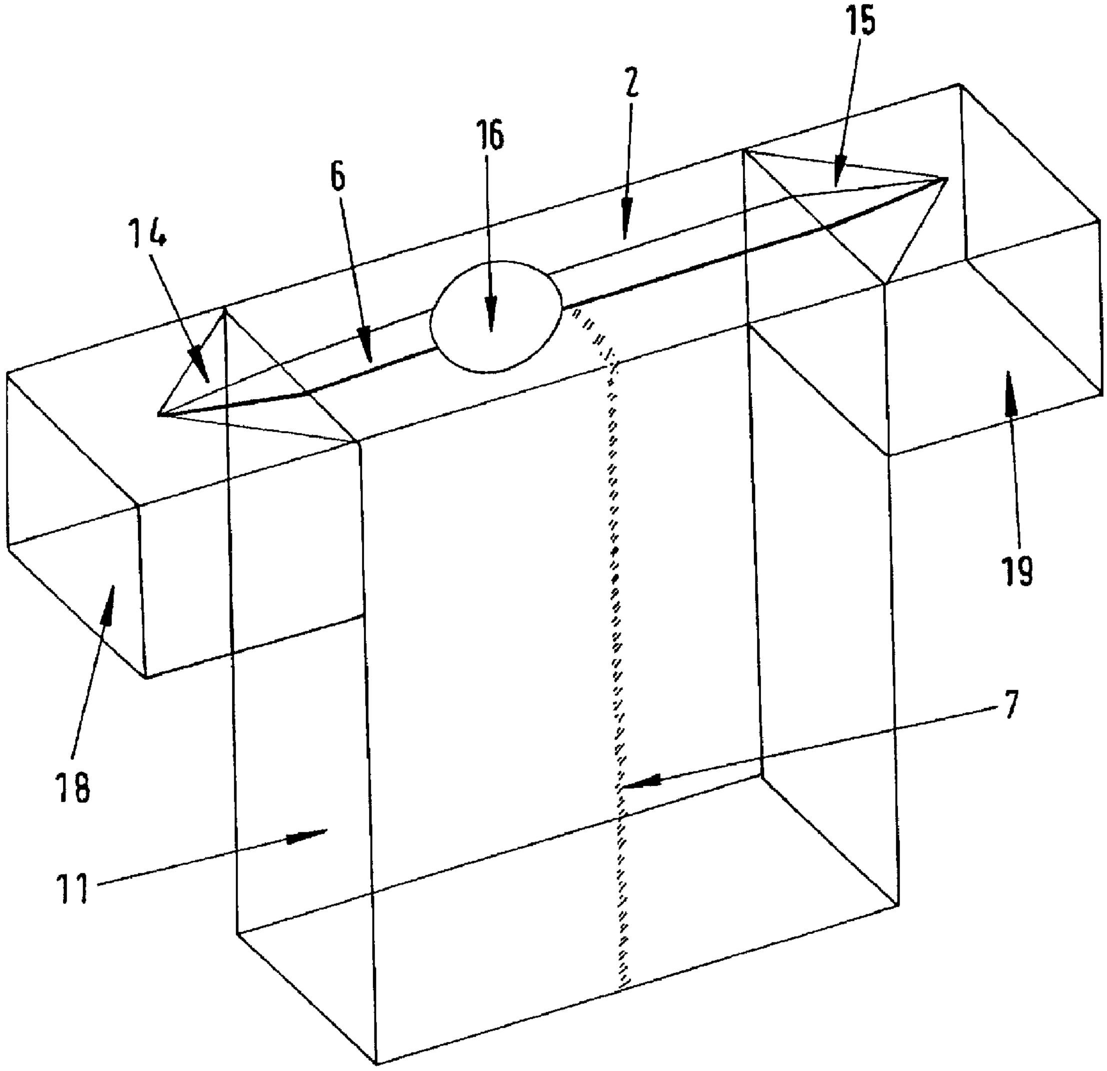

In the Figure sequence 7 to 12, the production method for a second embodiment of a filter bag according to the invention is represented. The first two method steps which are represented in FIGS. 7 and 8 are thereby identical to those described in detail in FIGS. 1 and 2. Deviating from the first embodiment however, the stacked layers 14, 15 which are formed by folding over the narrow sides are not folded back on the base 2 but on two lateral anvils 18 and 19 (see FIG. 9 in this respect). As now shown in FIG. 10, the base seam 6 is formed in a subsequent method step by welding, a continuous weld seam which extends from the outer end of the folded-over narrow sides 14 to the other end of the folded-over narrow side 15 now being produced by applying the lateral anvils 18 and 19. Advantageously, again a through-opening 16 is introduced during this method step in addition also by punching, over which through-opening a retaining plate with a corresponding opening is fitted subsequently.

Figure 11:
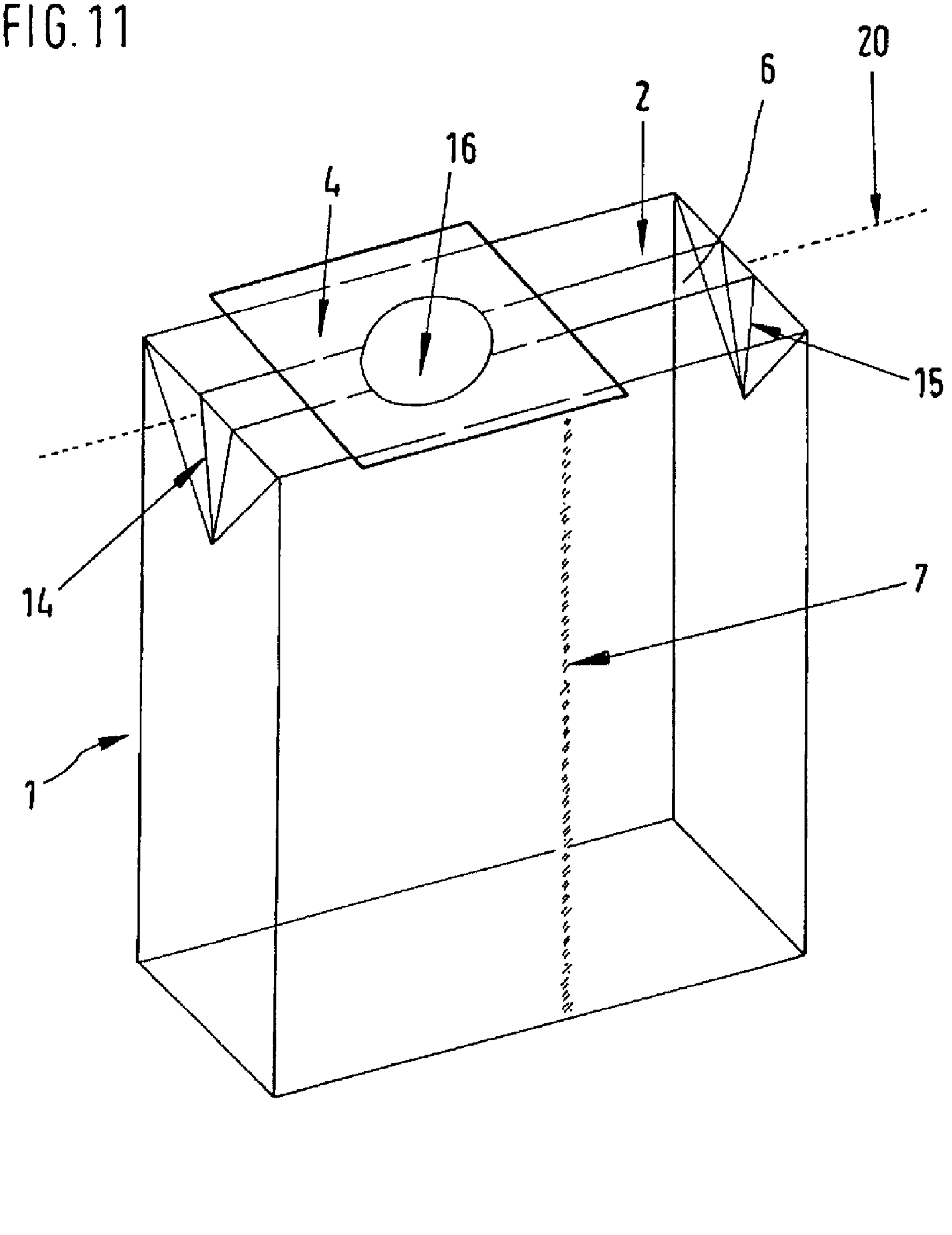

Subsequently, the anvils 18 and 19 are then removed and the narrow sides 14 and 15 are folded over completely onto the side faces of the filter bag 1 (FIG. 11).

Figure 12:
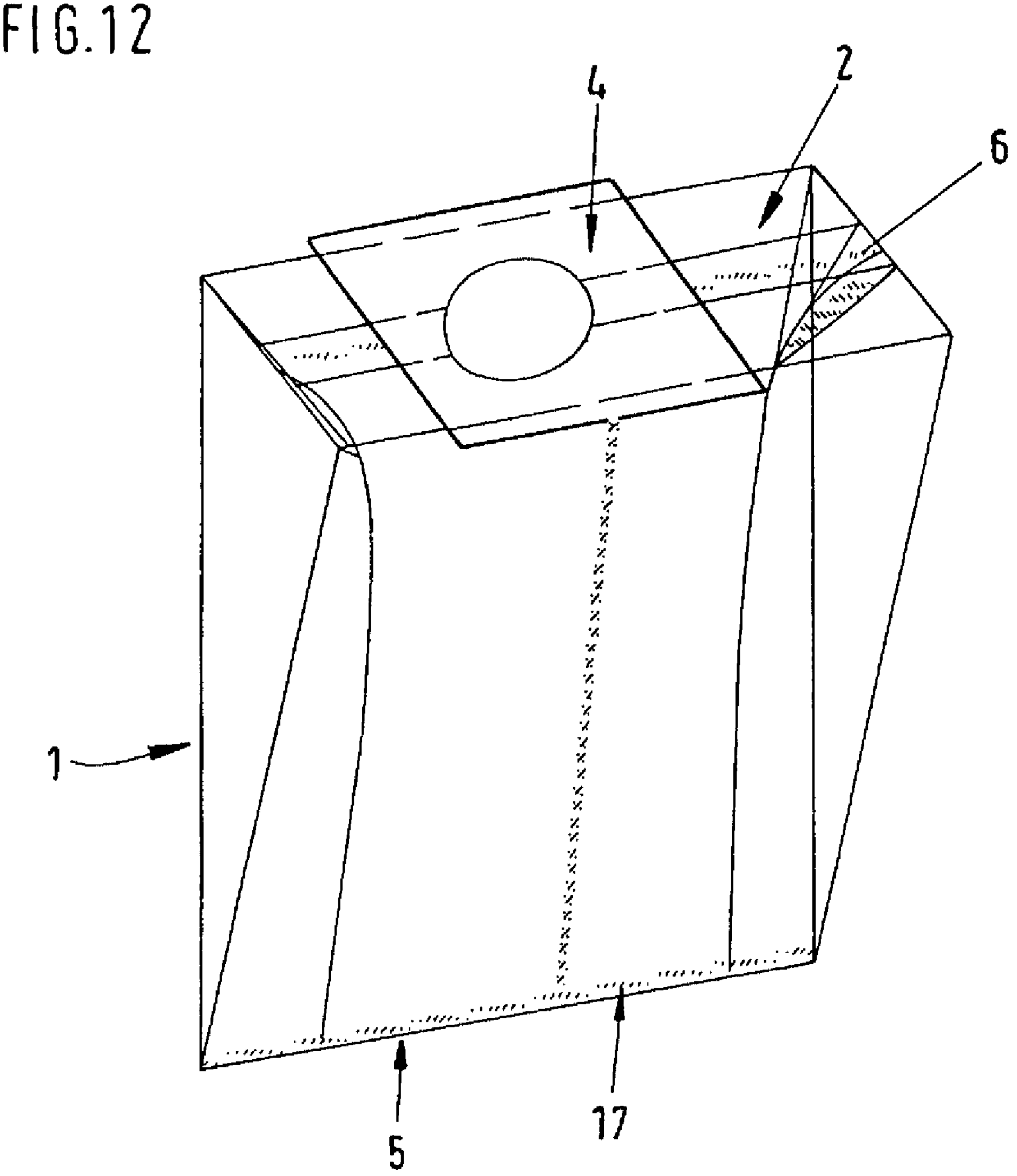

Subsequently, the filter bag 1 is then removed from the anvil 11 and the second sealed end region 5 is formed by introducing a weld seam 17. The then resulting filter bag 1 is in the end state, represented in FIG. 12.

Figure 13:
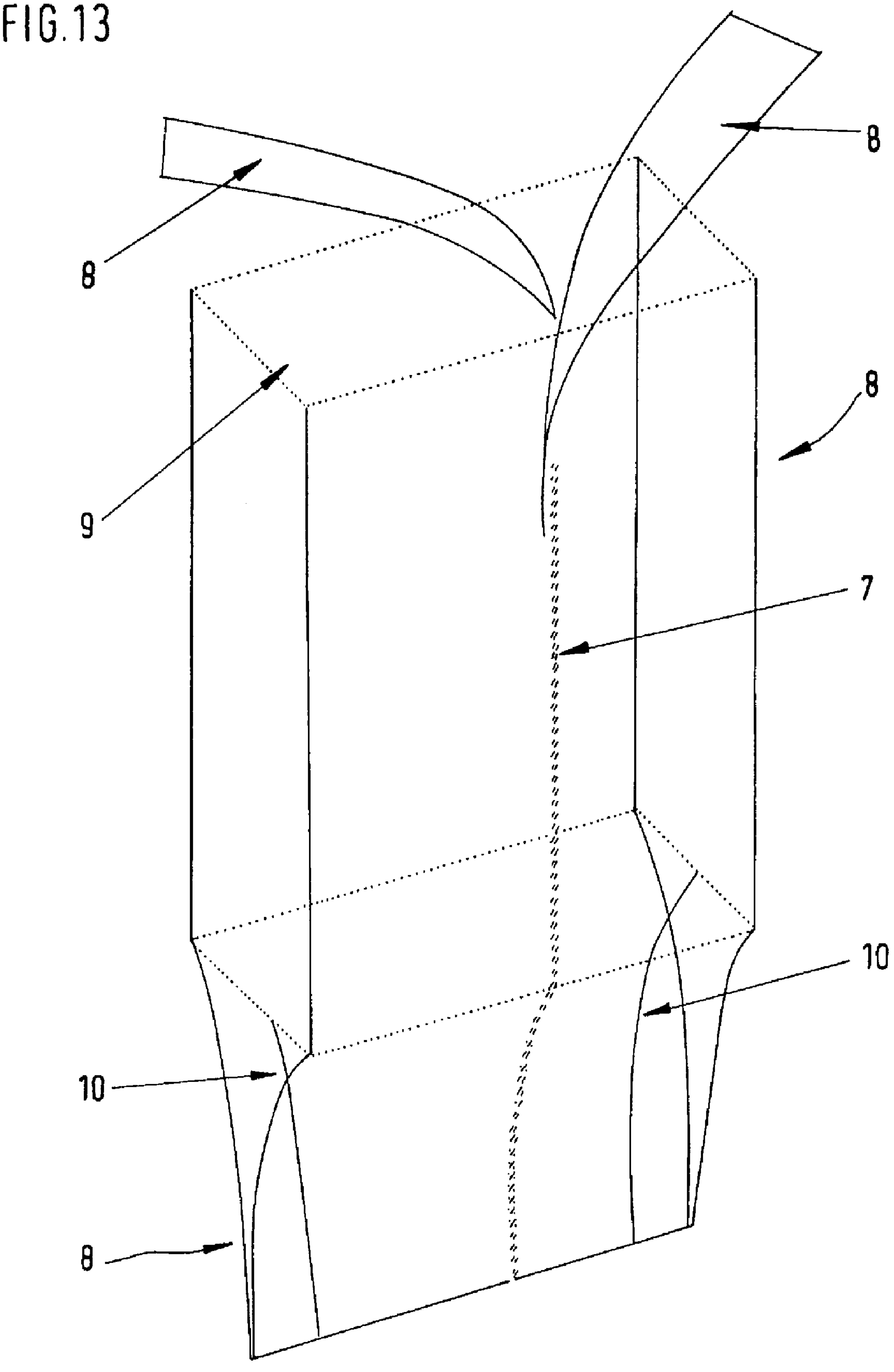
FIGS. 13 to 18 show the Figure sequence for the production of a third embodiment of the filter bag according to the invention.
Figure 14:
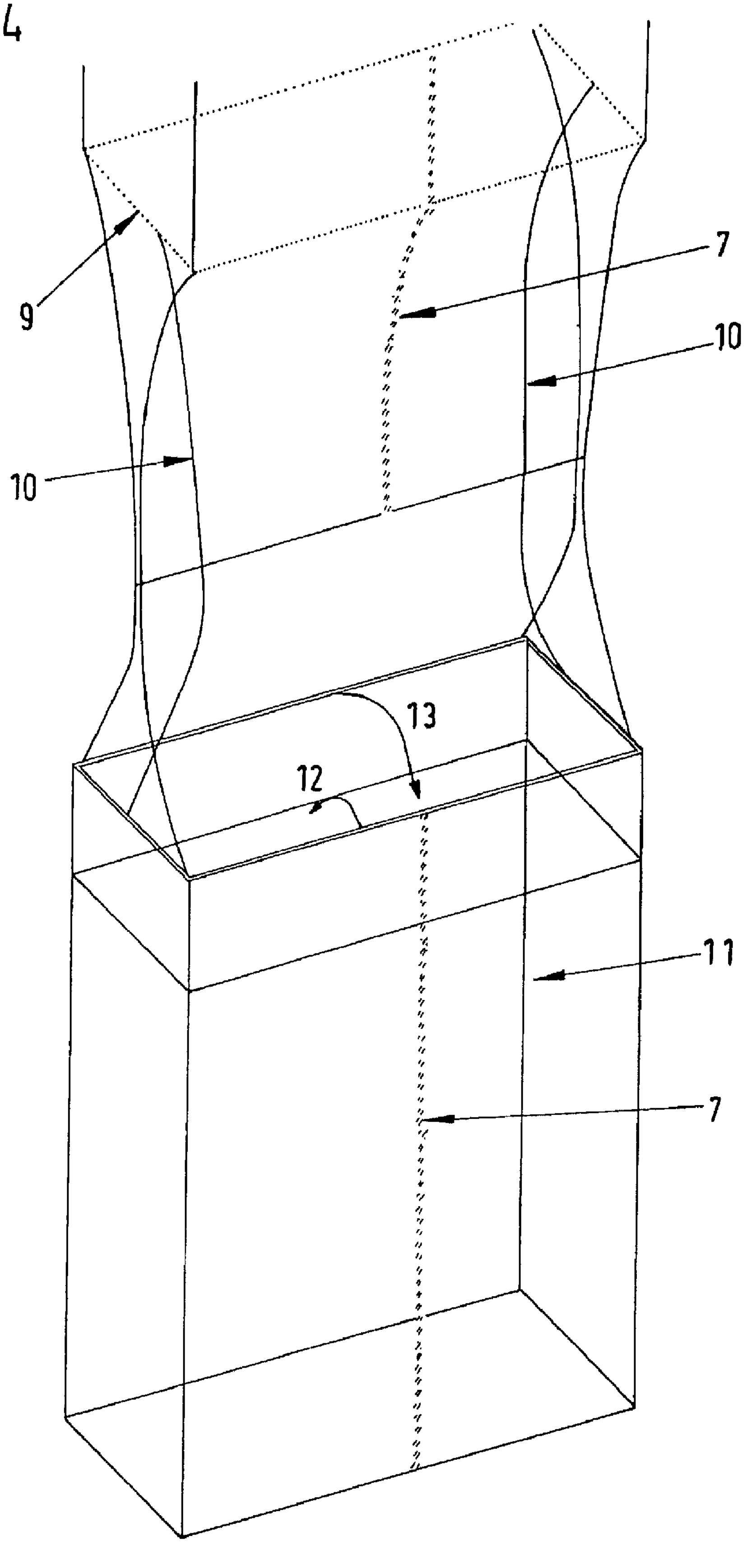
Figure 15:
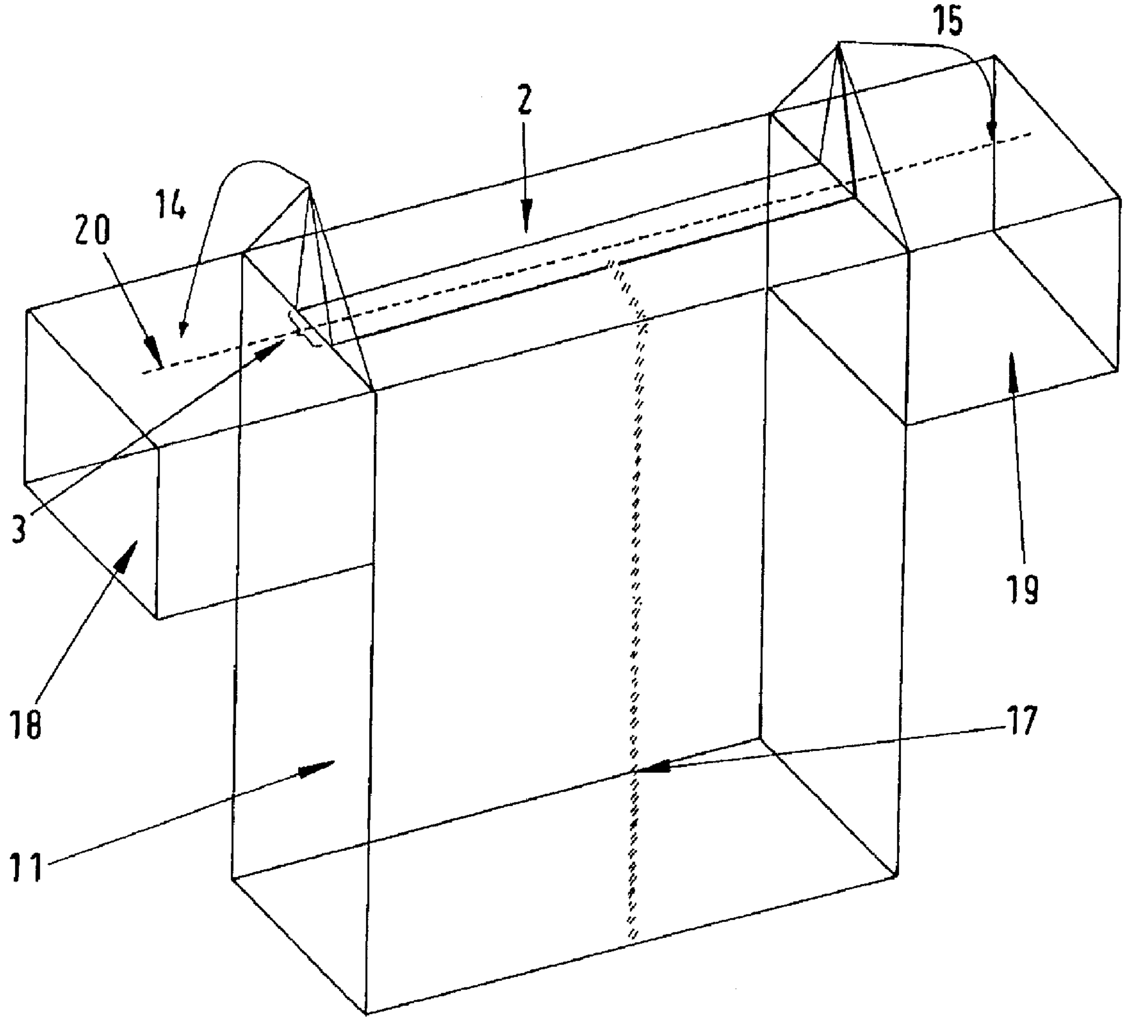
Figure 16:
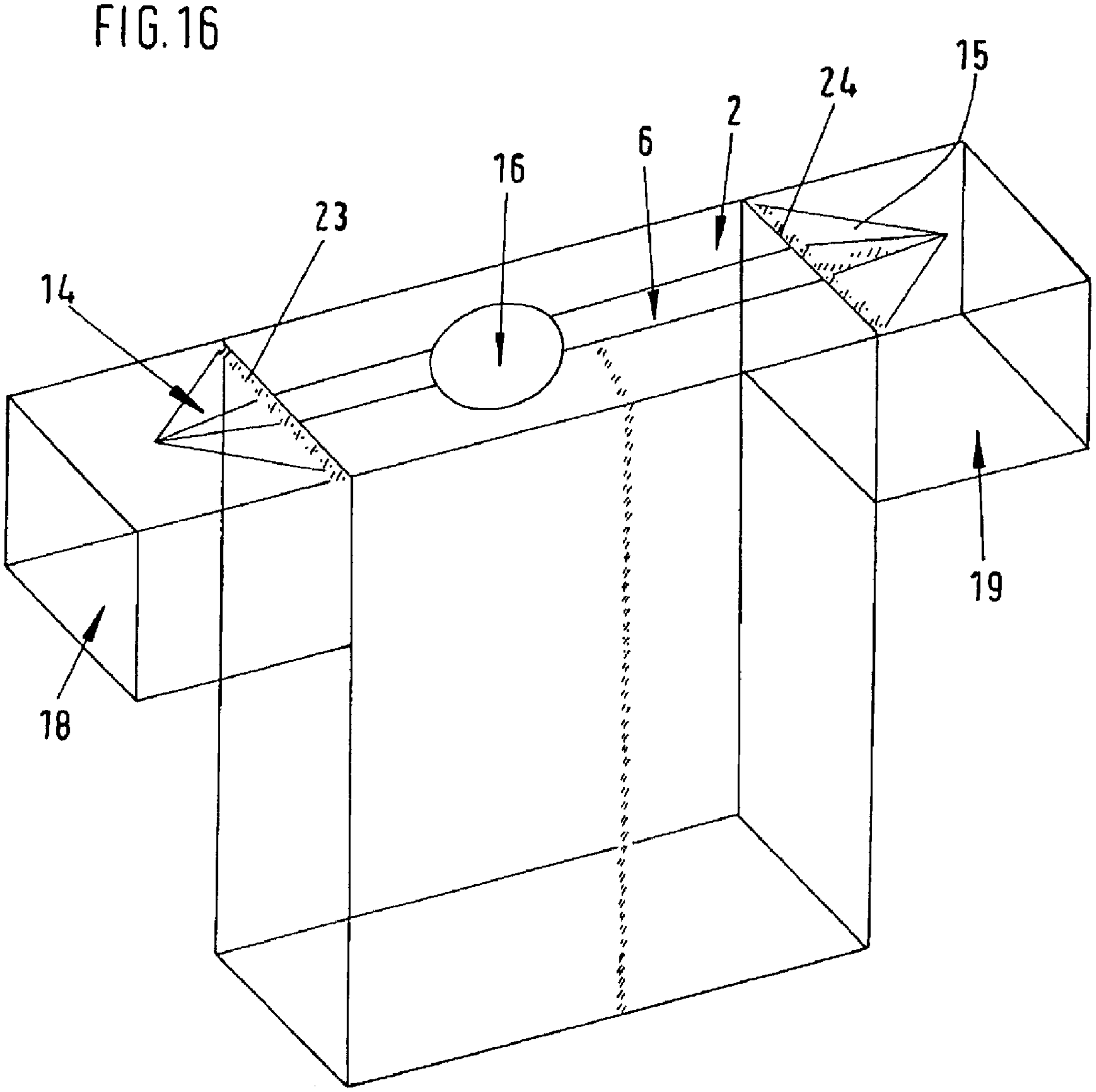
Figure 17:
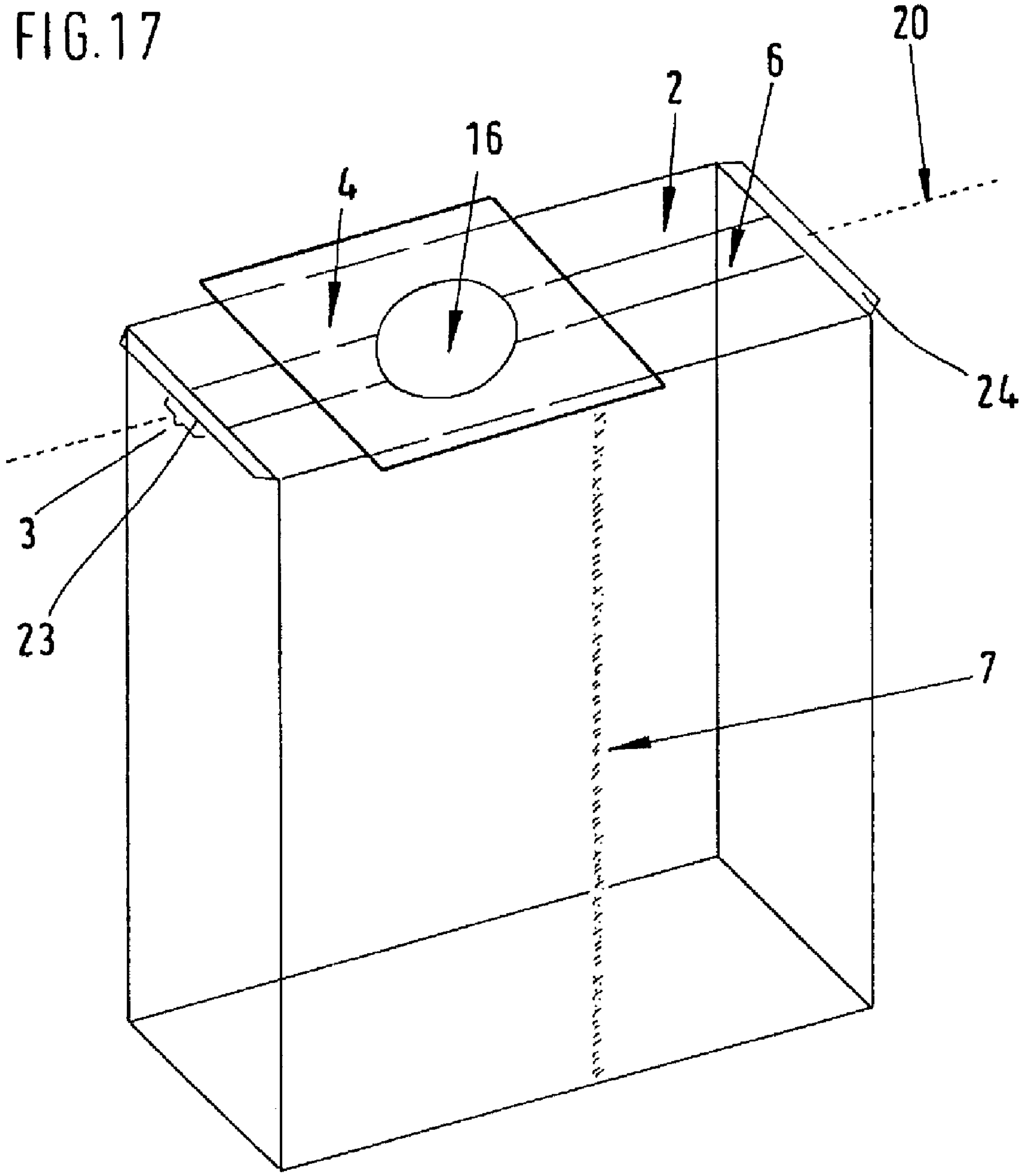
Figure 18:
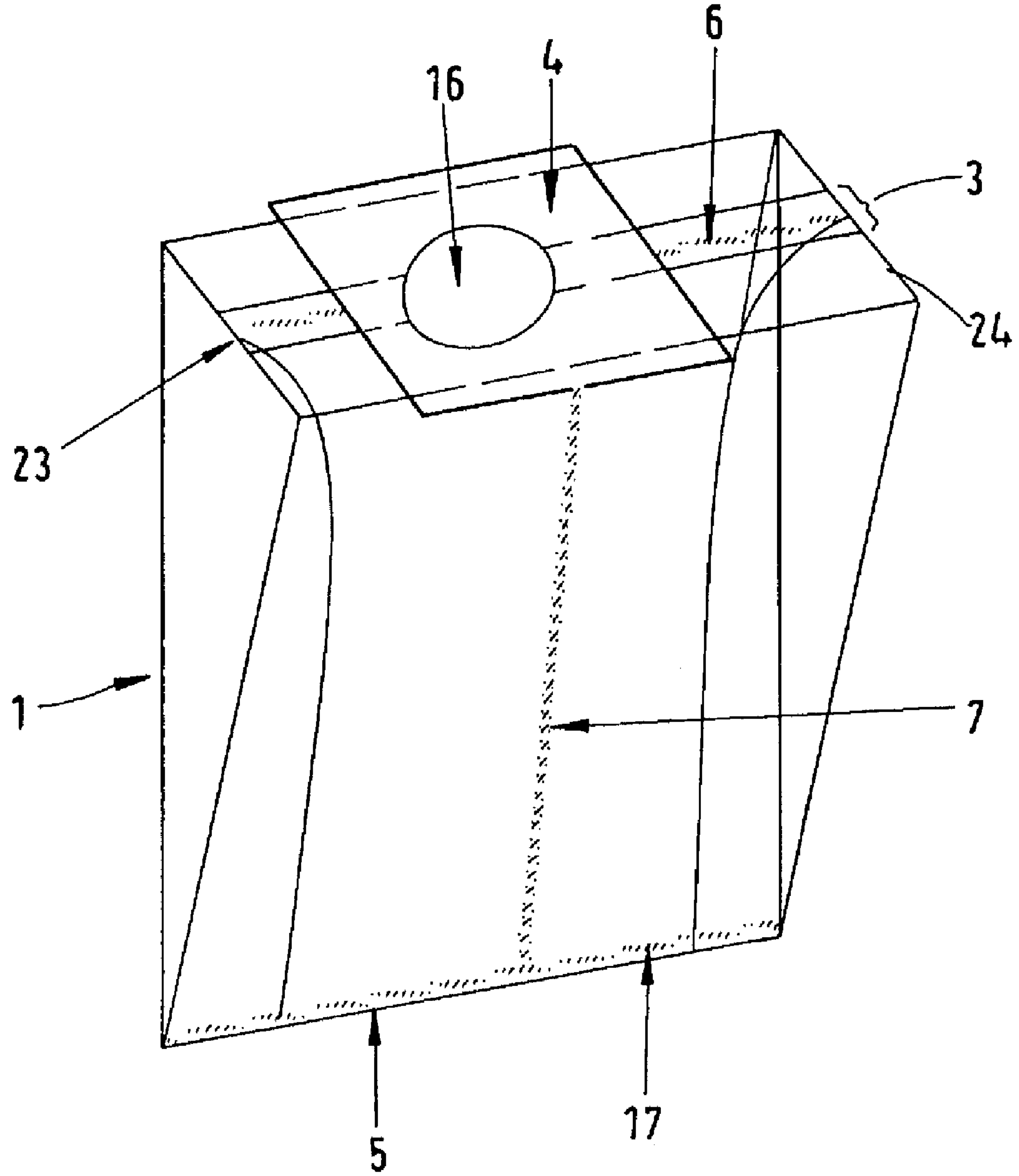

In the Figure sequence 13 to 18, the production method for a further preferred embodiment of a filter bag according to the invention is represented. The first method steps which are represented in FIGS. 13, 14 and 15 correspond to those previously discussed according to FIGS. 7, 8 and 9. In contrast to the previous embodiment, however now the folded-over narrow sides 14 and 15, as represented in FIG. 16, are not folded back onto the longitudinal sides but are removed by cutting after welding the overlapping region 3 by means of the central weld seam 6. In order to seal the filter bag 1, it is then provided in this embodiment that the narrow sides in the region of the base 2 are then sealed by an additional weld seam 23 and 24. After sealing by means of welding, the protruding region can then be separated. The state which is then produced is represented in FIG. 17. The ultimate form of the filter bag 1 which is produced in this embodiment is then reproduced in FIG. 18.

The invention claimed is:

1. A filter bag for a vacuum cleaner, comprising a tubular bag made of a casing which has at least one nonwoven layer, the casing having a first end region which is sealed at least in predetermined regions and a second sealed end region situated opposite the first region; and a retaining plate, wherein the first end region is configured as a base, the first end region which forms the base having an overlap of an inner side and an outer side of the casing, the overlapping region being connected at least partially by at least one weld seam.

2. The filter bag according to claim 1, wherein the weld seam in the base is guided over an entire width of the base.

3. The filter bag according to claim 1, wherein the overlap is at least 3 mm.

4. The filter bag according to claim 1, wherein the base has an oblong shape.

5. The filter bag according to claim 4, wherein the base has a rectangular shape.

6. The filter bag according to claim 4, wherein the first end region further has stacked layers which are formed in the predetermined regions by folding narrow sides of the casing of the rectangular base and which are connected to each other at least in predetermined regions.

7. The filter bag according to claim 6, wherein the stacked layers are disposed on the base by a folding back.

8. The filter bag according to claim 6, wherein the stacked layers are disposed on side faces by folding.

9. The filter bag according to claim 4, wherein the stacked layers which are formed in predetermined regions by folding are connected by at least one of gluing and welding.

10. The filter bag according to claim 4, wherein at least one of linear gluing and welding is present.

11. The filter bag according to claim 1, wherein, starting from the base towards the second end region, at least one pre-fold is introduced in the casing.

12. The filter bag according to claim 1, wherein, starting from respective corners of the base towards the second end region in the casing, pre-folds are introduced in the casing.

13. The filter bag according to claim 1, wherein, starting from the weld seam in the base, at least one pre-fold is introduced up to the second region in the casing.

14. The filter bag according to claim 1, wherein a pre-fold is introduced parallel to the weld seam in the base in the casing.

15. The filter bag according to claim 14, wherein the pre-fold is introduced at a spacing relative to the weld seam in the casing, which corresponds approximately to a width of the base.

16. The filter bag according to claim 1, wherein the retaining plate having at least one through-opening is situated on the base, the retaining plate at least partially covering the base.

17. The filter bag according to claim 16, wherein the retaining plate covers the entire base.

18. The filter bag according to claim 1, wherein the retaining plate having at least one through-opening is situated on the side face which extends between the first end region and the second end region of the bag.

19. The filter bag according to claim 18, wherein the retaining plate is disposed on a side face in the region of the base.

20. The filter bag according to claim 1, wherein the retaining plate is connected to the bag by at least one of gluing and welding.

21. The filter bag according to claim 1, wherein the retaining plate is comprised of a plastic material.

22. The filter bag according to claim 1, wherein the retaining plate is comprised of a cardboard.

23. The filter bag according to claim 1, wherein the casing is comprised of a nonwoven composite material.

24. The filter bag according to claim 23, wherein the filter bag is comprised of a nonwoven composite material having different filter properties.

25. A method for a production of a filter bag for a vacuum cleaner, comprising:

a) folding a casing web of a filter bag material over a template which defines a shape of the filter bag and welding a longitudinal seam to form a tube;

b) drawing the tube onto a corresponding anvil;

c) separating the corresponding tube section;

d) folding over longitudinal sides onto the anvil while forming an overlap of inner and outer sides of the casing;

e) at least partial welding the overlapping region to form a base;

f) removing the filter bag from the anvil; and g) welding a second end region.

26. The method according to claim 25, further comprising: after step d), folding narrow sides.

27. The method according to claim 25, further comprising: at least one of (1) during step a) and (2) after step a), introducing longitudinal folds.

28. The method according to claim 26, wherein the folding-over of the narrow sides is effected in a direction of the base.

29. The method according to claim 26, wherein the folding-over of the narrow sides onto a side orientated away from the base is effected onto an auxiliary anvil which extends almost flush with the base.

30. The method according to claim 27, wherein the at least partial welding of the overlapping region and narrow sides is effected at the same time.

31. The method according to claim 29, wherein the folded-over narrow sides are folded back onto the side faces and connected thereto.

32. The method according to claim 29, wherein the folded-over side faces of the narrow sides are removed at least partially by a cutting off.

33. The method according to claim 25, further comprising: after step e), punching a hole in a partially sealed end region which forms the base.

34. The method according to claim 33, wherein a retaining plate having a complementary opening is fixed on the base over the hole.

35. The method according to claim 25, wherein the process takes place in a cycle using a device.

* * * * *